US008473934B2

(12) United States Patent
Brockmeyer et al.

(10) Patent No.: US 8,473,934 B2
(45) Date of Patent: Jun. 25, 2013

(54) METHOD FOR MAPPING APPLICATIONS ON A MULTIPROCESSOR PLATFORM/SYSTEM

(75) Inventors: Erik Brockmeyer, Leuven (BE); Tanja Van Achteren, Korbeek-Lo (BE)

(73) Assignee: IMEC, Leuven (BE)

( * ) Notice: Subject to any disclaimer, the term of this patent is extended or adjusted under 35 U.S.C. 154(b) by 1875 days.

(21) Appl. No.: 11/486,986

(22) Filed: Jul. 14, 2006

(65) Prior Publication Data
US 2007/0174829 A1 Jul. 26, 2007

Related U.S. Application Data (60) Provisional application No. 60/699,712, filed on Jul. 15, 2005.

(51) Int. Cl.
*G06F 9/45* (2006.01)

(52) U.S. Cl.
USPC .......................................................... 717/149

(58) Field of Classification Search
None
See application file for complete search history.

(56) References Cited

U.S. PATENT DOCUMENTS

| | | | | |
|---|---|---|---|---|
| 5,414,849 | A | * | 5/1995 | Yamamoto ..................... 717/149 |
| 6,243,863 | B1 | * | 6/2001 | Kothari et al. ................. 717/149 |
| 6,480,876 | B2 | * | 11/2002 | Rehg et al. ..................... 718/100 |
| 6,609,088 | B1 | | 8/2003 | Wuytack et al. |
| 6,681,388 | B1 | * | 1/2004 | Sato et al. ...................... 717/159 |
| 6,850,947 | B1 | * | 2/2005 | Chung et al. ................... 707/600 |
| 7,861,118 | B2 | * | 12/2010 | Edwards et al. ................ 714/38 |
| 2002/0124012 | A1 | * | 9/2002 | Liem et al. ..................... 707/200 |
| 2003/0188299 | A1 | * | 10/2003 | Broughton et al. ............ 717/141 |
| 2005/0081202 | A1 | | 4/2005 | Brokenshire et al. ......... 718/100 |

FOREIGN PATENT DOCUMENTS

EP 0974906 1/2000

OTHER PUBLICATIONS

Peter Slock, Sven Wuytack, Francky Catthoor, and Gjalt de Jong. 1997. Fast and extensive system-level memory exploration for ATM applications. In Proceedings of the 10th international symposium on System synthesis (ISSS '97). IEEE Computer Society, Washington, DC, USA, 74-81.*
Lo et al. "Tuning Compiler Optimizations for Simultaneous Multithreading", 1997, MICRO 30 Proceedings of the 30th annual ACM/IEEE international symposium on Microarchitecture.*
Zhiyuan Li, "Reducing Cache Conflicts by Partitioning and Privatizing Shared Array", 1999, 1999 International Conference on Parallel Architecture and Compilation Techniques.*
Achteren et al. (2002). Data reuse exploration techniques for loop-dominated applications. *Proceedings of the 2002 Design, Automation and Test in Europe Conference and Exhibition, IEEE*. 8 pp.
Brockmeyer et al. (2003). Layer assignment techniques for low energy in multi-layered memory organizations. *Proceedings of the Design, Automation and Test in Europe Conference and Exhibition, IEEE*. pp. 1-6.

(Continued)

*Primary Examiner* — Chat Do
*Assistant Examiner* — Jue Wang
(74) *Attorney, Agent, or Firm* — Knobbe Martens Olson & Bear LLP (57) ABSTRACT

In one aspect, there is a formalized method for mapping applications on a multiprocessor system. In particular re-use possibilities are explored, e.g. focus on data transfer and memory access issues, with the aim of obtaining low-power and low-energy mappings and/or to overcome memory performance or energy bottlenecks.

17 Claims, 4 Drawing Sheets

OTHER PUBLICATIONS

Chao and Wang (1993). Iteration bounds of single-rate data flow graphs for concurrent processing. *IEEE Transactions on Circuits and Systems-1: Fundamental Theory and Applications*. 40(9):629-634.

Dasygenis et al. (2005). A memory hierarchical layer assigning and prefetching technique to overcome the memory performance/energy bottleneck. *Proceedings of the Design, Automation and Test in Europe Conference and Exhibition, IEEE*. 2 pp.

Gerez et al. (1992). A polynomial-time algorithm for the computation of the iteration-period bound in recursive data-flow graphs. *IEEE Transactions on Circuits and Systems-1: Fundamental Theory and Applications*. 39(1):49-52.

Issenin et al. (2004). Data reuse analysis technique for software-controlled memory hierarchies. *Proceedings of the Design, Automation and Test in Europe Conference and Exhibition, IEEE*. 6 pp.

Wuytack et al. (1998). Formalized methodology for data reuse exploration for low-power hierarchical memory mappings. *IEEE Transactions on Very Large Scale Integration (VLSI) Systems*, 6(4):529-537.

European Search Report mailed Jan. 12, 2009 and completed Dec. 18, 2008 for EP 06014811.1.

Brockmeyer et al. "Layer Assignment Techniques for Low Energy in Multi-Layered Memory Organisations." *Proceedings of the Design, Automation, and Test in Europe Conference and Exhibition*. pp. 1-6. 2003.

Li et al. "Compiling Communication-Efficient Programs for Massively Parallel Machines." *JTED Systems*. 2(3):361-376 (1991).

* cited by examiner

METHOD FOR MAPPING APPLICATIONS ON A MULTIPROCESSOR PLATFORM/SYSTEM

CROSS REFERENCE TO RELATED APPLICATIONS

This application claims the benefit of U.S. Provisional No. 60/699,712, filed Jul. 15, 2005, which is incorporated by reference hereby in its entirety.

BACKGROUND

1. Field of the Invention

The invention relates to methods for mapping or exploring mappings of applications on a multiprocessor platform or system.

2. Description of the Related Technology

Certain inventive aspects relate to the disclosure of the U.S. Pat. No. 6,609,088 and the European patent application no. EP-0974906 on 'System-level power optimization of data storage and transfer', which are herewith incorporated by reference, but adapted for use in a multiprocessor context.

The use of a memory hierarchy for optimizing at least power consumption of essentially digital systems, performing data-dominated applications, is known. The idea of using a memory hierarchy to minimize the power consumption of the essentially digital systems is based on the fact that memory power consumption depends primarily on the access frequency and the size of the memories. Power savings can be obtained by accessing heavily used data from smaller memories instead of from large background memories. Such an optimization requires architectural transformations that consist of adding layers of smaller and smaller memories to which frequently used data can be copied. Memory hierarchy optimization introduces copies of data from larger to smaller memories in the data flow graph. This means that there is a trade-off involved here: on the one hand, power consumption is decreased because data is now read mostly from smaller memories, while on the other hand, power consumption is increased because extra memory transfers are introduced. Moreover, adding another layer of hierarchy can also have a negative effect on the area and interconnect cost, and as a consequence also on the power consumption because of the larger capacitance involved. The memory hierarchy design task has to find the best solution for this trade-off. Some custom memory hierarchy experiments on real-life applications can be found in literature but often the search space, being the potential memory hierarchies which can be exploited, is not extensively examined. No systematic exploration method for deciding on which memory hierarchy is optimal with respect to power consumption of the digital system is known.

Data reuse exploration, memory hierarchy layer assignment, and the concept of block transfers in single processor context are known from [S. Wuytack, J. P. Diguet, F. Catthoor, H. De Man: "Formalized methodology for data reuse exploration for low-power hierarchical memory mappings", IEEE Trans. on VLSI Systems, vol. 6, no. 4, pages 529-537, December 1998], [T. Van Achteren, G. Deconinck, F. Catthoor, R. Lauwereins: "Data Reuse Exploration Methodology for Loop-dominated Applications", IEEE/ACM Design Automation and Test Conference, Paris, France, Mar. 4-8, 2002], [I. Issenin, E. Brockmeyer, M. Miranda, N. Dutt: "Data reuse technique for software-controlled memory hierarchies", In Design Automation and Test in Europe, February 2004.], [Erik Brockmeyer, Miguel Miranda, Henk Corporaal, Francky Catthoor: "Layer Assignment Techniques for Low Energy in Multi-layered Memory Organizations", Proc. 6th ACM/IEEE Design and Test in Europe Conf. 2003], [Minas Dasygenis, Erik Brockmeyer, Bart Durinck, Francky Catthoor, Dimitrios Soudris, Antonios Thanailakis: "A Memory Hierarchical Layer Assigning and Prefetching Technique to Overcome the Memory Performance/Energy Bottlenecks", 2005, 946-947].

SUMMARY OF CERTAIN INVENTIVE ASPECTS

It is an object of certain inventive aspects to provide good methods for mapping or exploring mappings of applications on a multiprocessor platform or system.

It is an advantage of certain inventive aspects that it presents a formalized method and system for part of the design decisions, related to memory, involved while designing an essentially digital system comprising a plurality of computation units and a plurality of memories connected by a network.

Inventive aspects relate to mapping applications on a multiprocessor platform or system, in particular systems on chip with multiple processing units (microprocessors, digital signal processors, or combinations thereof). Aspects of the disclosed mapping methods or mapping exploration methods particularly explore data re-use possibilities, e.g. focus on data transfer and memory access issues, with the aim of obtaining low-power or low energy mappings and/or to overcome memory performance/energy bottlenecks.

Mapping of applications (which are not executable or difficult to execute in real-time on single processing unit systems) on such multiprocessor systems requires distribution of the application over the system parts. The distribution can be based on a pipelining approach (leading to a good instruction locality) or on dividing the application such that each application part acts on parts of the data to be processed by the application (leading to a good data locality), and preferably on combinations of these distribution techniques, the combination preferably be chosen based on characteristics of the application and/or the system/platform where the application will be executed on. It is to be noted that in some cases instruction locality and data locality may have the same impact on energy consumption of the application. The pipelining approach is, however, simpler to implement since no data consistency problems arise.

The general context is the exploration of various distributions, in a platform independent way, though eventually for the final mapping platform characteristics may be taken into account. The exploration may evaluate energy, timing and/or area (of the required system/platform) for the various distributions.

Inventive aspects provide information for allowing to decide on a final mapping/distribution and subsequently the application code is then to be parallelized in accordance therewith, preferably in an automated way.

Certain inventive aspects are further complementary to approaches for determining optimal parallelization, which are based on a simulation based approach, evaluating dependencies, while certain inventive aspects calculate the information directly from the application code, more in particular from a data flow representation of the application code.

Besides the multiple processing units, the system-on-chip (SOC) has an interconnect network (network-on-chip; NOC), possibly just a bus approach, for the units. Additionally the SOC has a hierarchical multi-layer memory organization. Preferably the SOC has one or more direct memory access channels (DMA's) supporting the mappings obtained.

Inventive aspects may take into consideration the capabilities of such NOC for guaranteeing network conditions needed to implement a feasible distribution, for instance bandwidth reservation techniques. Similar consideration may be made for the middleware.

It is clear that besides a single application approach, certain inventive aspects may be cast in a context wherein multiple applications must be mapped on one and the same SOC. The presented approach may consider the set of applications as one big application or a "divide and conquer" approach may be used, wherein certain inventive aspects are applied to one or a subset of the applications and the information is thereafter combined.

For the context of multiple computation units, the concept of shared copies may be introduced, wherein with shared is meant "related to at least two computation units". As a consequence also synch candidates may be defined. Generally important is that shared sync may be needed in a writing context and that reading may be done via a so-called private transfer.

For the context of multiple computation units, the concept of shared copies and shared block transfers may be introduced, wherein with shared is meant "related to at least two computation units". As a consequence also synch candidates may be defined. Generally important is that shared sync may be needed in a writing context and that reading may be done via a so-called private block transfer.

A block transfer is a sort of pre-fetching of data but then not data directly needed for consumption by a processing unit, but as a copy-candidate, hence as a transfer between different hierarchical levels in the memory. Indicators on when to start the block transfer (issue) and when the block transfer is ready (sync) are used.

The concept of block transfers is introduced, which in practice may be implemented via a DMA-type approach.

Further an approach of (optimal) block and/or copy transfer placement based on in-place concepts, extended to include besides the data arrays, data copies and also the time axis extension, based on an as early as possible approach, within the given area specification is disclosed, while the in-place concepts are disclosed in the granted patents 'Method for the size optimization of storage units' EP-0867808 and its US counterpart U.S. Pat. No. 6,078,745, which are incorporated herein by reference The presence of a NOC in a multiple computation unit context is considered, where the NOC operations in a resource sharing mode introduce an unpredictability, to be taken in consideration in the block transfer placement approach, in particular by exploiting the time extension axis.

In general, inventive embodiments need to work with a suitable representation of the application, which is often serial but preferably parallel tolerant.

A method is disclosed for determining (optimal) block and/or copy placement (timing) in such a shared copy/block transfer context, by determining critical loops, which may be cross thread (each thread related to a different unit) and even across different iterations of a loop. Prior-art critical path algorithms may be used.

A part of the heuristic is to add or change only in the critical loop.

Also a NOC architecture is disclosed which can enforce the conditions on the NOC required for the sync of the block transfers.

The presented techniques do not change computation order, but arrange the data transfer given a predetermined computation order.

The issue is that, for exploitation of the shared block transfer concept, synchronization is needed beyond the synchronization needed from data dependency point of view. On the other hand the methods are working on loaded code, which is still sequential, meaning over-synchronized.

Some inventive aspects can be formalized as follows:

A first inventive aspect provides a method of determining an optimal mapping of application code, enabling, after mapping of the code, efficient execution of the code on a digital system comprising a plurality of computation units and a plurality of memories connected by a network. The method according to the inventive aspect comprises:

loading a representation of application code, describing the functionality of the application, the code comprising data access instructions on array signals, the representation of the code being partitioned in a plurality of code threads and the representation including information on data dependencies between the code threads;

determining for at least one array signal and for at least one data access instruction on the array signal a graph having a plurality of data groupings and indicating whether the data grouping is assignable to either one or more of the code threads;

evaluating for combinations of the data groupings an evaluation criterion;

selecting the combination of the data groupings with an optimum evaluation criterion within a pre-determined tolerance, while taking into account the data dependencies when the data groupings are assignable to more than one code thread, the selection defining the optimal mapping.

With a representation of application code may be meant a model of the application code, for example a geometric model, such as for example a polyhedral model.

With an optimum evaluation criterion within a pre-determined tolerance may be meant an evaluation criterion having a lowest or highest value (depending on the criterion), or having a value which is considered "good enough", i.e. not necessarily all possibilities need to be explored, as long as one possibility with a result beyond a pre-determined value (lower or higher, again depending on the criterion) is found.

The evaluation criterion may include energy consumption for executing data accesses to the memories. Alternatively or on top thereof, the evaluation criterion may include energy consumption of data transfers needed for inter-thread synchronization.

The memories in the digital system may comprise a set of first memories, each of the first memories assigned to a computation unit, and at least one second memory, assigned to at least two of the computation units, the data accesses including data transfers between the first memories and the computation units and data transfers between the first memories and the second memory.

The step of selecting may comprise performing life-time analysis of the arrays taking into account accesses on the array by at least two of the threads.

The selecting may include performing an array-level dependency analysis.

The step of determining a plurality of data groupings may include determining at least two data grouping access timing possibilities to the data groupings, the step of evaluating an evaluation criterion may include evaluating the data access timing possibilities and the step of selecting a combination of data groupings with optimal evaluation criterion within a predetermined tolerance may include selecting one of the data grouping access timing possibilities. The data access timing possibilities may include at least one timing before the data access is required by a code thread.

A second inventive aspect provides a method of modifying application code enabling, after modification of the code, efficient execution of the code on an essentially digital system comprising a plurality of computation units and a plurality of memories, connected by a network. The method comprises:

applying any of the methods of determining an optimal mapping of application code as described above; and modifying the application code based on the selected combination of the data groupings such that the modified application code includes data accesses to the selected data groupings while preventing occurrence of data dependency violations in case the data groupings are assignable to more than one code thread.

In particular, the second inventive aspect provides a method of modifying application code enabling, after modification of the code, efficient execution of the code on an essentially digital system comprising a plurality of computation units and a plurality of memories, connected by a network. The method comprises:

loading a representation of application code, describing the functionality of the application, wherein the code comprises data access instructions on array signals, the representation of the code being partitioned in a plurality of code threads and the representation including information on data dependencies between the code threads;

determining for at least one array signal and for at least one data access instruction on the array signal a graph having a plurality of data groupings and indicating whether the data grouping is assignable to either one or more of the code threads;

evaluating for combinations of the data groupings an evaluation criterion;

selecting the combination of the data groupings with the optimal and/or lowest and/or highest evaluation criterion while taking into account the data dependencies when the data groupings are assignable to more than one code thread, the selection defining the optimal mapping; and modifying the application code based on the selected combination of the data groupings such that the modified application code includes data accesses to the selected data groupings while preventing the occurrence of data dependency violations in case the data groupings are assignable to more than one code thread.

Preventing occurrence of data dependency violations may be performed by providing synchronization instructions within the modified code.

Modifying the code may include imposing the data accesses to the data groupings at the selected data access timing.

A third inventive aspect provides an automated code mapping system for determining an optimal mapping of application code, enabling, after mapping, efficient execution of the code on a digital system comprising a plurality of computation units and a plurality of memories connected by a network. The automated code mapping system comprises:

memory means for storing a representation of application code describing the functionality of the application, the code comprising data access instructions on array signals, the representation of the code being partitioned in a plurality of code threads and the representation including information on data dependencies between the code threads;

a first computing device adapted for determining for at least one array signal and for at least one data access instruction on the array signal a graph having a plurality of data groupings and indicating whether the data grouping is assignable to either one or more of the code threads;

a second computing device adapted for evaluating for combinations of the data groupings an evaluation criterion;

a third computing device for selecting the combination of the data groupings with an optimum evaluation criterion within a pre-determined tolerance, e.g. lowest or highest, depending on the selected evaluation criterion, while taking into account the data dependencies when the data groupings are assignable to more than one code thread, the selection defining the optimal mapping.

The first to third computing devices may be comprised by a single computer such as a workstation running suitable software for implementing certain inventive aspects and using the code describing the digital device as an input.

The evaluation criterion may be power consumption. The second computing device may also evaluate combinations in accordance with a further evaluation criterion, e.g. memory size, and the third computing device may select in accordance with a combination of the evaluation criterion and the further evaluation criterion.

The memories may comprise a set of first memories, each of the first memories assigned to a computation unit, and at least one second memory, assigned to at least two of the computation units, the data accesses including data transfers between the first memories and the computation units and data transfers between the first memories and the second memory.

A fourth inventive aspect provides an automated code modification system for modifying application code enabling, after modification of the code, efficient execution of the code on an essentially digital system comprising a plurality of computation units and a plurality of memories, connected by a network. The automated code modification system comprises:

memory means for storing a representation of application code, describing the functionality of the application, wherein the code comprises data access instructions on array signals, the representation of the code being partitioned in a plurality of code threads and the representation including information on data dependencies between the code threads;

a first computation device adapted for determining for at least one array signal and for at least one data access instruction on the array signal a graph having a plurality of data groupings and indicating whether the data grouping is assignable to either one or more of the code threads;

a second computation device adapted for evaluating for combinations of the data groupings an evaluation criterion;

a third computation device for selecting the combination of the data groupings with an optimum evaluation criterion within a pre-determined tolerance, while taking into account the data dependencies when the data groupings are assignable to more than one code thread, the selection defining the optimal mapping, and programming means for modifying the application code based on the selected combination of the data groupings such that the modified application code includes data accesses to the selected data groupings while preventing occurrence of data dependency violations in case the data groupings are assignable to more than one code thread.

A fifth inventive aspect provides a computer program product which provides the functionality of any of the methods according to some embodiments when executed on a computing device. The computing device may include one of a microprocessor and an FPGA. Further, certain inventive aspects include a data carrier such as a CD-ROM or a diskette which stores the computer program product in a machine readable form and which executes at least one of the methods of embodiments when executed on a computing device. Nowadays, such software is often offered on the Internet or a company Intranet for download, hence certain inventive aspects include transmitting the computer program product over a local or wide area network.

Certain inventive aspects are set out in the accompanying independent and dependent claims. Features from the dependent claims may be combined with features of the independent claims and with features of other dependent claims as appropriate and not merely as explicitly set out in the claims.

The above and other characteristics, features and advantages of certain inventive aspects will become apparent from the following detailed description, taken in conjunction with the accompanying drawings, which illustrate, by way of example, the principles of certain inventive aspects. This description is given for the sake of example only, without limiting the inventive scope. The reference figures quoted below refer to the attached drawings.

BRIEF DESCRIPTION OF THE DRAWINGS

The drawings show various inventive embodiments as follows.

In the different figures, the same reference signs refer to the same or analogous elements.

DETAILED DESCRIPTION OF CERTAIN ILLUSTRATIVE EMBODIMENTS

Various inventive embodiments are disclosed below to show examples of the invention, but the invention is not limited to these embodiments.

An essentially digital system in accordance with certain embodiments comprises a plurality of computation units and a plurality of memories connected by a network. The memories can be organized in several manners. It can be a plurality of off-chip memories or a serial and/or parallel concatenation of memories (partly off-chip and on-chip). In one embodiment, such a concatenation (further called memory hierarchy) is assumed. The hierarchy comprises a main memory and intermediate memories. Memory layers can be defined. Two memories belong to a same layer when the memories are functionally at the same distance from a processor, meaning the same amount of memories are between the memories of the layer and the processor.

In one embodiment a previously determined optimized memory hierarchy or organization (how many memories, which size for each memory, interconnection patterns of the memories, for example) is used, and code is mapped thereon such that the essentially digital system can run with an optimal and/or minimal power consumption. The mapping of code is based on examination of data reuse possibilities.

An essentially digital device has a certain functionality, which can be represented by code, written in a suitable programming language. One embodiment focuses on data-dominated applications which are defined as applications wherein power consumption due to accessing data in memories dominates the power consumption due to arithmetic operations. Loop constructs and read instructions on array signals, being often defined also as multidimensional data types, are therefore considered to be most important with respect to power consumption optimization.

Indeed, each read instruction means accessing a memory. The goal of introducing a memory hierarchy is to ensure that the required data is obtained from a smaller (and thus less power consuming) memory. The data stored in the smaller memories is preferably reused thus improving efficiency. It must be emphasized that introducing a memory hierarchy also requires some code modifications. It must be indicated in each read instruction from which memory the data is read. For the method of determining optimal mapping of application code in accordance with some embodiments, the digital device under consideration must only be described with code describing its functionality. The essentially digital system being considered and optimized thus does not yet need to be realized in hardware. The method according to some embodiments can be exploited in the design steps for such a digital system.

The storage of data in a plurality of memories requires also additional reads from the memories in the memory organization and thus leads to additional power consumption. The method according to some embodiments can include the step of checking whether changing code mapping helps in optimizing and/or minimizing power or not, and whether such a power optimization can be done without a large increase of the total memory size of the memories of the digital device. Hence, some embodiments include optimization of code mapping based on one or more evaluation criteria. For example, additional power consumption due to more interconnects can also be taken into account.

Multi-Processor Data Reuse

When parallelizing an application (resulting in a portioning of code into a plurality of code threads), often some data is shared between the different parallel threads, or after mapping the application to the multiprocessor platform, data accesses are assignable to a plurality of the computation units of the platform. When extending data reuse exploration in a multi-processor context, new opportunities arise for shared copy candidates for data reuse or as explained further for pre-fetching, i.e. fetching data early enough so that the processor does not have to stall when it is really needed.

With data reuse is meant that a part of the data is copied from one layer to a lower layer in a memory hierarchy, from where it is read multiple times. As a result, energy can be saved, since most accesses take place on the smaller copy and not on the large and more energy consuming original data, but the price is in the memory size needed in the lower layer.

Many different opportunities exist for making a data reuse copy. These are called copy candidates. A relation exists between the size of a copy candidate and the number of transfers from the higher layer. In theory any copy candidate size, ranging from one element to the full array size is a potential candidate. However, in practice only a limited set of copy candidates leads to efficient solutions.

Figure 1:
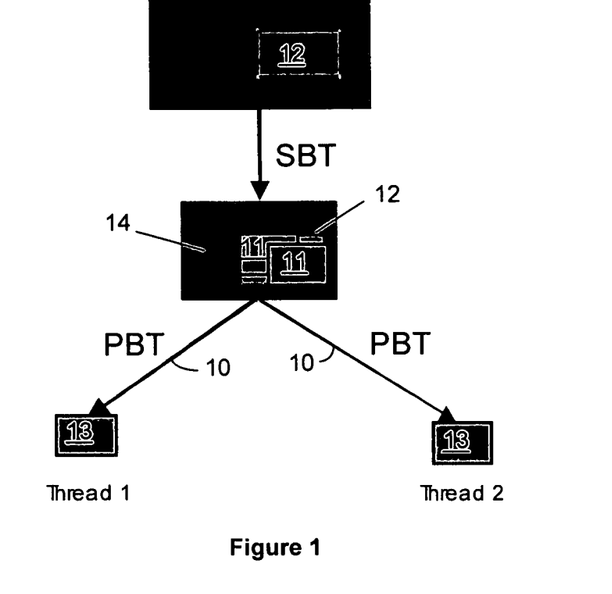
FIG. 1 illustrates two threads reading from a shared copy candidate copying the data in a private copy candidate. The example elucidates a shared block transfer (SBT) and private block transfers (PBT).
Figure 2:
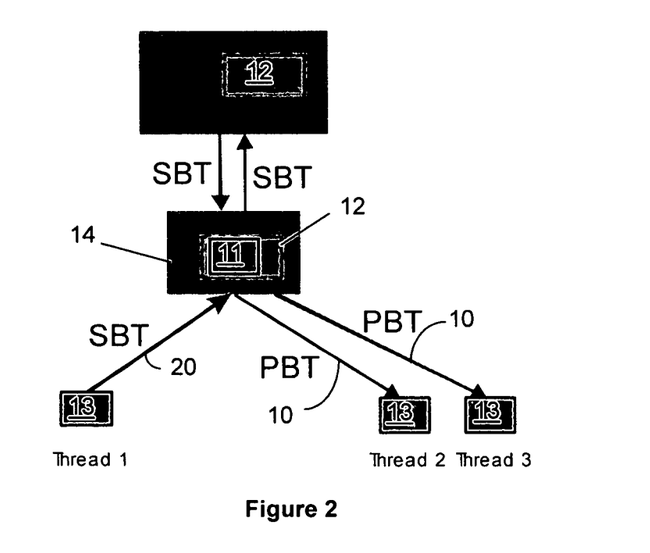
FIG. 2 illustrates one thread writing to a shared copy candidate and two threads reading from this shared copy candidate. The example elucidates shared block transfers (SBT) and private block transfers (PBT).

The principle of data reuse is illustrated in FIG. 1 for two threads 10 (or their assigned computation units) reading overlapping sub-arrays 11, typically occurring for data-split level parallelization, where threads are performing the same task on different partially overlapping data sets. Hence one may identify data groupings, which are suitable for data reuse possibilities. A shared copy-candidate 12 including the data for both private copies 13 can be identified and stored once for both threads in an intermediate shared memory layer 14. The same principle can be applied (however, not illustrated in FIG. 1) in the case where both threads 10 are writing to the shared copy candidate 12, or the case where one thread 10 is writing to a shared copy candidate 12 and one or more threads 10 are reading from this shared copy candidate 12. The latter is typically occurring for functional-split parallelization, where threads 10 are interchanging data between different tasks, and is illustrated in FIG. 2. In FIG. 2, one thread 20 is writing from a private copy 13 into a shared copy candidate 12, and two threads 10 are reading from this shared copy candidate 12.

In a multi-processor context a distinction is made between private and shared copy-candidates.

DEFINITION

A private copy candidate/array is an array read and written (updated) by only one application thread.

A shared copy candidate/array is an array read and written (updated) by more than one application threads.

Since the threads 10, 20 are running asynchronously in a multiprocessor system, finding these shared copy candidates 12 is a different problem than in the single processor case, where the execution order of the data accesses is fixed. The way the threads 10, 20 are synchronized is needed as an additional input, by at least providing information on data dependencies between the threads 10, 20. In addition to the already existing timing constraints and size and energy costs for a single-processor platform, the copy-candidate selection heuristic has to take into account a multi-processor platform with private (assigned to a single computation unit) and shared (assigned to at least two computation unit) memories, perform inter-thread life-time analysis, and take into account inter-thread data dependencies and the cost of inter-thread synchronization (due to the additional data transfers).

Assigning arrays and copy candidates to memory layers involves an energy versus size trade-off.

Once a copy candidate 12 is selected, a synchronization scheme has to be defined between the multiple threads 10, 20 to control the shared block transfers SBT to this inter-thread copy candidate 12, such that no inter-thread data dependencies are violated.

Multi-Processor Block Transfers

A copy candidate 12 is updated with new elements via block transfers (BTs). A block transfer corresponds to a transfer of a block of data between two arrays in the source code. These arrays can be either original arrays declared in the original source code or arrays added as copy candidates 12 after the data re-use and memory hierarchy layer assignment step. When these arrays are located in physically different memories, the block transfer corresponds to a data transfer over a physical connection between these two memories. The size of the data in the block transfer varies between 1 element and the complete size of the array/copy candidate.

Block transfers are preferably handled by a DMA controller. DMA is short for Direct Memory Access, and a DMA controller is a component that interacts directly with the memory subsystem. Its sole purpose is to copy data from one memory location to another. This is a task a micro processor could do on its own as well, but when a DMA controller is dedicated to this task, it does so more efficiently. A DMA controller is given a copy-command by a processor, which can continue performing useful calculations at the same time. After completing a copy command, the DMA controller signals the issuing processor that the block transfer has been performed so that the processor execution can synchronize on it (using middleware or OS functionality). Immediately after this, the DMA controller will perform the next copy-command, if any is available.

In a multi-processor context with a partially local, partially shared memory hierarchy, a distinction is made between private block transfers and shared block transfers.

DEFINITION

A private block transfer (PBT) is issued by one and only one thread. It corresponds to a block transfer between a private copy candidate 13 of the thread 10 on the one end and a private or shared copy candidate 12 on the other end.

A small code example of a private block transfer PBT is given below.

```
int A[ ],B[ ];
int A_copy[ ];
for y {
    for x1 {              /* loop L1 */
        ... = B[ ];
    }
    BT(id);               /* issue block transfer: A[ ] -> A_copy[ ] */
    for x2 {              /* loop L2 */
        ... = A_copy[ ];
    }
}
```

The loops L1 and L2 comprise an introductory statement (FOR), defining the iterators and their scope, a closing statement (}) and a loop body with a read instruction to a variable B and A_copy respectively.

The block transfer is issued by the processor by the command BT(id) before the loop L2. The DMA then copies the data from array A[ ] to the copy candidate A_copy[ ]. The processor stalls until the block transfer is finished, since the transferred data is read from the copy candidate 12 in the following loop L2.

DEFINITION

A shared block transfer (SBT) is issued by n threads, n>1. It corresponds to a block transfer from a private copy candidate 13 or a shared copy candidate 12 to a shared copy candidate 12 shared by the n threads. The actual block transfer is issued after all n issues have been taken place (logical AND operator). This means barrier synchronization for the corresponding block transfer thread, but not for the issuing threads.

A small code example of a shared block transfer is given hereinbelow.

```
int A[ ];
int A_copy[ ];
/* thread 1 */
int B[ ];
for y {
    for x1 {                /* loop L1 */
        ... = B[ ];
    }
    SBT(id);                /* issue block transfer: A[ ] -> A_copy[ ] */
    for x2 {                /* loop L2 */
        ... = A_copy[ ];
    }
}
/* thread 2 */
int C[ ],D[ ];
for y {
    for x3 {                /* loop L3 */
        ... = C[ ];
    }
    for x3 {                /* loop L4 */
        ... = D[ ];
    }
    SBT(id);                /* issue block transfer: A[ ] -> A_copy[ ] */
    for x4 {                /* loop L5 */
        ... A_copy[ ];
    }
}
```

The block transfer from A[ ] to A copy[ ] is shared since the transferred data is read by the two threads in each y iteration. Therefore the y loops of both threads have to be synchronized. To make sure that data is not overwritten before it is read, or read before it is written, each of the two threads have to synchronize on the issue of the shared block transfer. The actual block transfer in the DMA only starts when both threads have issued. Both processors stall until the shared block transfer is finished.

Multi-Processor Time Extensions

Although exploiting data reuse opportunities provides great benefits, performance can be further improved by scheduling some block transfers (BT) earlier, which are called time extensions (TEs). TEs enable to increase the performance of a system, with minimal cost. They enable the selective pre-fetching of copy candidates 12 from off-chip memory layers to on-chip memory layers, exploiting the lifetime information of copies.

In the code example with a private block transfer illustrated above, the private block transfer is issued just in time before the loop L2, where the data is needed. This means that the processor is stalled until the block transfer is finished. The same example with a time extension is given hereinbelow.

```
int A[ ],B[ ];
int A_copy[ ];
for y {
    BT_issue(id);           /* issue block transfer: A[ ] -> A_copy[ ] */
    for x1 {                /* loop L1 */
        ... = B[ ];
    }
    BT_sync(id);            /* wait until block transfer is finished */
    for x2 {                /* loop L2 */
        ... = A_copy[ ];
    }
}
```

Figure 3:
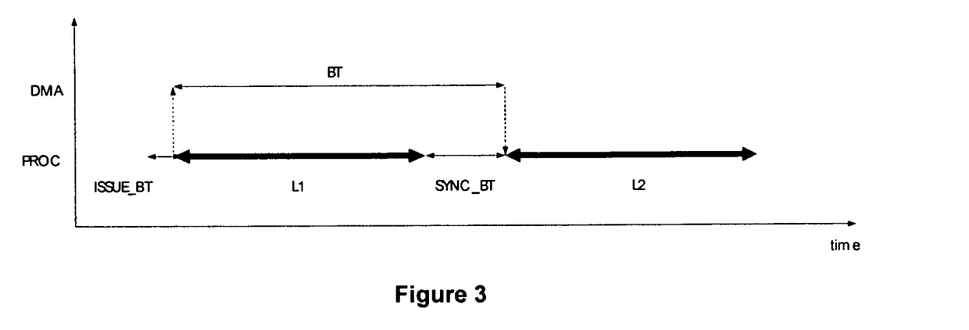
FIG. 3 is a schedule of private block transfer with time extension: parallelization of block transfers by the DMA.

The block transfer command is split up in two parts: BT_issue and BT_sync. A possible schedule for one iteration of the y-loop is given in FIG. 3. After the block transfer is issued by BT_issue, the application thread goes further with processing (loop L1 in this example) until BT_sync is called. The block transfer itself is handled in parallel by the DMA. BT_sync then actually waits for the block transfer to finish before it enters loop L2.

In the code example with the shared block transfer illustrated above, the shared block transfer is issued just in time before the loop L2 and L5 in thread 1 and thread 2 respectively. The two threads are assigned to two different processors. Both processors are stalled until the block transfer is finished. The same example with time extensions is given hereinbelow.

```
int A[ ];
int A_copy[ ];
/* thread 1 */
int B[ ];
for y {
    SBT_issue(id);          /* issue BT: A[ ] -> A_copy[ ] */
    for x1 {                /* loop L1 */
        ... = B[ ];
    }
    SBT_sync(id);           /* wait until block transfer is finished */
    for x2 {                /* loop L2 */
        ... = A_copy[ ];
    }
}
/* thread 2 */
int C[ ],D[ ];
for y {
    for x3 {                /* loop L3 */
        ... = C[ ];
        for x3 {            /* loop L4 */
            ... = D[ ];
        }
    }
    SBT_sync(id);           /* wait until block transfer is finished */
    for x4 {                /* loop L5 */
        ... = A_copy[ ];
    }
}
```

Figure 4:
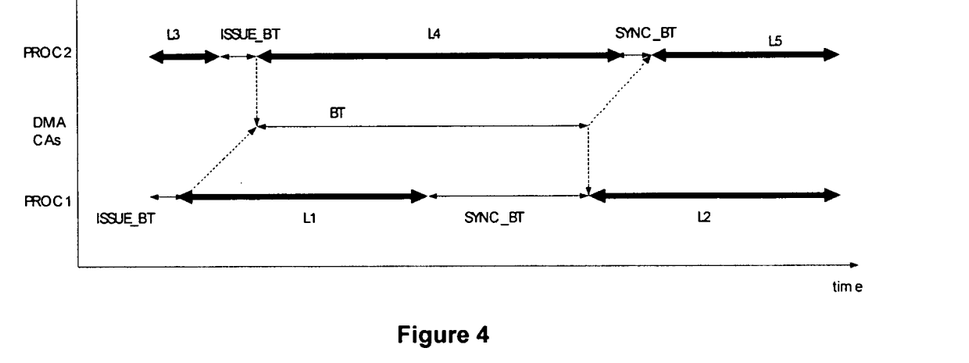
FIG. 4 is a schedule of share block transfers with time extensions: parallelization of block transfers by the DMA. It illustrates that threads run asynchronously, but interlocked by the SBT.

A possible schedule for one iteration of the y-loop is given in FIG. 4. An issuing thread does not wait for the end of the block transfer and proceeds with its own processing until the synchronizing SBT_sync command. The synchronizing SBT_sync command is blocking on the end of the corresponding block transfer. In summary, the threads thread 1 and thread 2 are running asynchronously, but are interlocked by the shared block transfer.

Preferably the block transfers are completely hidden by useful processing in the application thread. It comes at a certain cost though. Indeed, copy candidates consume temporary memory space, for that part of the code when they are active. The earlier the block transfer is issued, the more increased the lifetime of the copy candidate is, and the more associated memory space has to be reserved. The lifetime information of all copy candidates and arrays may be taken into account as a cost function during the selection of copy candidates. In a multi-processor context with copy candidates in shared memory, additional information on the synchronization of the threads and block transfers is needed to extract this lifetime information.

Types of Time Extensions

Simple Time Extensions

Simple time extensions exploit the freedom to move the issue of the block transfer before earlier sub-loops than the sub-loop with the accesses to the copy.

```
           for y
               for x1
                   B[ ]
                   BT_ISSUE_AND_SYNC(A_x2)
                   for x2
                       A_x2[ ]
becomes:
           for y
               BT_ISSUE(A_x2)
               for x1
                   B[ ]
                   BT_SYNC(A_x2)
                   for x2
                       A_x2[ ]
```

For the duration of the x1-loop, the block transfer will be in parallel with processing.

Pipelined Time Extensions

If no earlier sub-loops are available, or if not all block transfer duration is put in parallel yet, pipelined time extensions exploit the freedom to move the issue of block transfer before sub-loops in an earlier iteration of the loop.

```
           for y=0 .. W
               BT_ISSUE_AND_SYNC(B_x1)
               for x1
                   B_x1[ ]
                   for x2
                       A[ ]
becomes:
           BT_ISSUE(B_x1)
           for y=0 .. W
               BT_SYNC(B_x1)
               for x1
                   B_x1[ ]
                   if (y < W)
                       BT_ISSUE(B_x1)
                   for x2
                       A[ ]
```

Except for the first block transfer, the block transfer will be in parallel with processing of the x2-loop.

Parallel Pipelined Time Extensions

If not all block transfer duration can be hidden by a simple or pipelined time extension or if no sub-loops are present (fully nested case), a parallel pipelined time extension can put the transfer for the n-th iteration in parallel with the processing of the n−1-th iteration.

```
           for y=0 .. W
               BT_ISSUE_AND_SYNC(A_x)
               for x
                   A_x[ ]
becomes:
           BT_ISSUE(A_x[0])
           for y=0 .. W
               BT_SYNC(A_x[y%2])
               if (y<W)
                   BT_ISSUE(A_x[(y+1)%2])
               for x
                   A_x[ ]
```

Except for the first block transfer, the block transfer will be in parallel with processing of the $x$-loop. It is to be noted that this overlaps the lifetimes of the data of the block transfers of two successive iterations and the copy candidate selection scheme must check whether that size is available.

Block Transfer Dependencies

Inside a given data and control flow of 1 thread

When scheduling the block transfers earlier, the freedom can be limited by several type of dependencies. The block transfer "inherits" the dependencies from the access it is for: e.g. if an access depends on a value written in an earlier statement, the block transfer will also depend on this statement and cannot be scheduled before it.

When scheduling block transfers over an iteration boundary, memory dependencies do have to be taken into account.

Using scalar-level analysis, dependencies between all references to an array will be found, even if the data elements they actually access are not dependent, because they do not overlap. Scalar-level dependency analysis is not good enough for the memory dependencies, because the freedom will be too limited. Array-level dependency analysis taking into account the accessed part of the array, is needed to find more freedom.

Array-level dependency analysis is a matter of looking at the overlap in the accesses' extents in the previous and next iteration, which can easily be done in the geometrical view of the data reuse analysis. Additional dependency information on each copy candidate expresses which accesses are dependent, and the sub-loops which contain these accesses are the limits of the block transfer scheduling freedom.

Other dependencies than the memory dependencies, reference (data dependent array index) and control (conditions), are preferably also traced. Scalar-level analysis is sufficient for this type of dependencies because data dependent array indices and control expression will mostly be based on scalar values and no freedom is lost.

Inter Block Transfer Dependencies

When different block transfers for the same array are scheduled (different BTs of the same copy or BTs from different copies of the same array), there can be dependencies between the block transfers that have to be taken into account.

The logic behind this is as follows: if a BT dependency is to an access covered by another copy with an associated BT, the BT dependency moves to that associated BT.

Inter-Thread Data and Block Transfer Dependencies

In a multi-processor context scheduling private and shared block transfers earlier are additionally subjected to inter-thread dependencies and block transfer dependencies. Since the threads are running asynchronously, explicit synchronization points have to be introduced to avoid violation of inter-thread data dependencies. Time extensions of private and shared block transfers have to be considered globally over the different threads taking into account the inter-thread dependencies.

For example, in FIG. 1 the private block transfers PBT are dependent on the shared block transfer SBT in the higher layer, and can not start before the shared block transfer SBT is finished. Similarly, in FIG. 2 the private block transfers PBT for thread 2 and thread 3 are dependent on the shared block transfers SBT from thread 1 and the higher layer. The dependency on other block transfers can be indicated as extra arguments in the BT_issue command, e.g.:

. . .
SBT_issue(id1);
. . .
BT_issue(id2, dep id1);
. . .

The private block transfer with id id2 is dependent on the shared block transfer with id id1. When time extensions are performed on the issue of the private block transfer, the specification of the dependency makes sure that the actual block transfer is not started before the shared block transfer is finished.

Multi-Processor Time Estimation and Time Extension Optimization

In a single-processor context, time estimation after copy candidates and block transfers have been added, is a quite straightforward process. Without time extensions, the execution times of computation and block transfer delays are simply added together in a global time cost for the single thread. Time extensions (partially) parallelize block transfers with computation. The potential time won is then subtracted from this time cost. This cost is then used in a time extension aware heuristic for the selection of copy candidates and their associated block transfers.

In a multi-processor context this strategy does not work. Indeed, due to the inter-thread data and block transfer dependencies and associated synchronization, time extensions have to be considered globally for all threads. For example, for a shared block transfer a time extension of the issue in one thread not necessarily influences the global execution time. For example, in the code example with shared block transfer time extensions as given above, the global execution time is defined by thread 2, since it is the last thread to issue the shared block transfer.

Therefore a parallel thread model is created where block transfers are added as individual parallel threads. An example of three loop threads synchronized via three shared block transfers is given in FIG. 5. The numbers indicate the execution time in cycles of the associated computation block. The arrows indicate sequence edges within the threads, or dependency edges between the different threads. The arrows incident to the SBT block correspond to the SBT_issue commands. The arrows departing from the SBT blocks correspond to the SBT_sync commands. Ignoring the shared block transfer synchronization, each iteration of the individual loop threads takes 110 cycles. In reality, due to the block transfer dependencies, the global execution time is 300 cycles over two iterations, or 150 cycles per iteration on average. This is illustrated in the schedule in FIG. 6.

Figure 5:
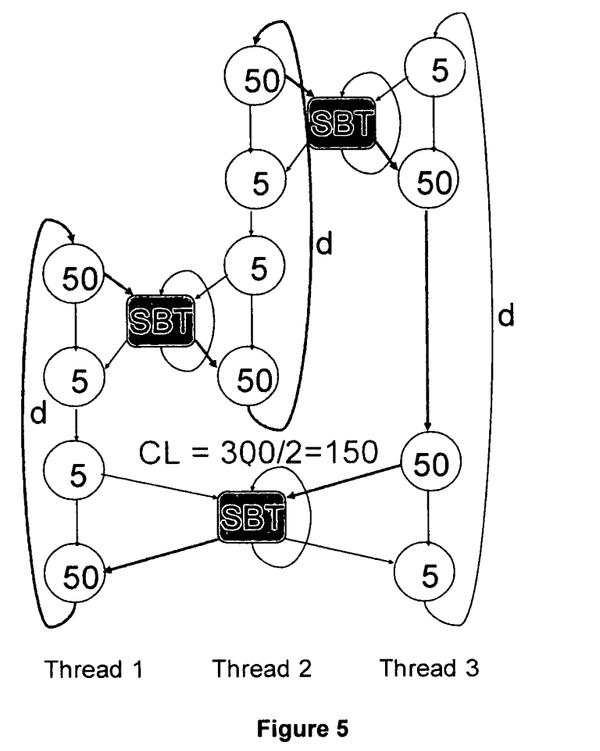
FIG. 5 shows an example of a parallel thread model with a critical path over two iterations.
Figure 6:
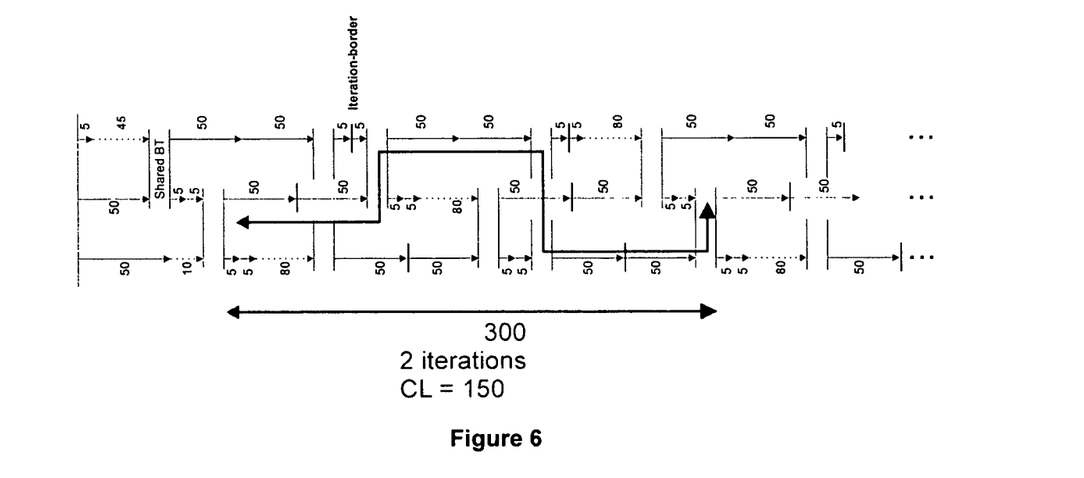
FIG. 6 is a schedule of the parallel thread model in FIG. 5 with a critical path over two iterations.

For fast exploration of different copy candidate and block transfer selections, the global time estimation can be performed directly on the parallel thread model, without explicitly making a schedule. This is done by applying critical path duration computation of data flow graphs, as described in [D. Y. Chao, D. T Wang: "Iteration bounds of single-rate data flow graphs for concurrent processing", IEEE Trans. On circuits and systems—I, Vol. 40, No 9, September 1993] or [S. H. Gerez, S. M. Heemstra de Groot, O. E. Herrman: "A polynomial-time algorithm for the computation of the iteration-bound in recursive data flow graphs", IEEE Trans. On circuits and systems—I, Vol. 39, No. 1, January 1992] in the present context of parallel thread models. The edges of the critical path for the example in FIG. 5 are in bold.

Figure 7:
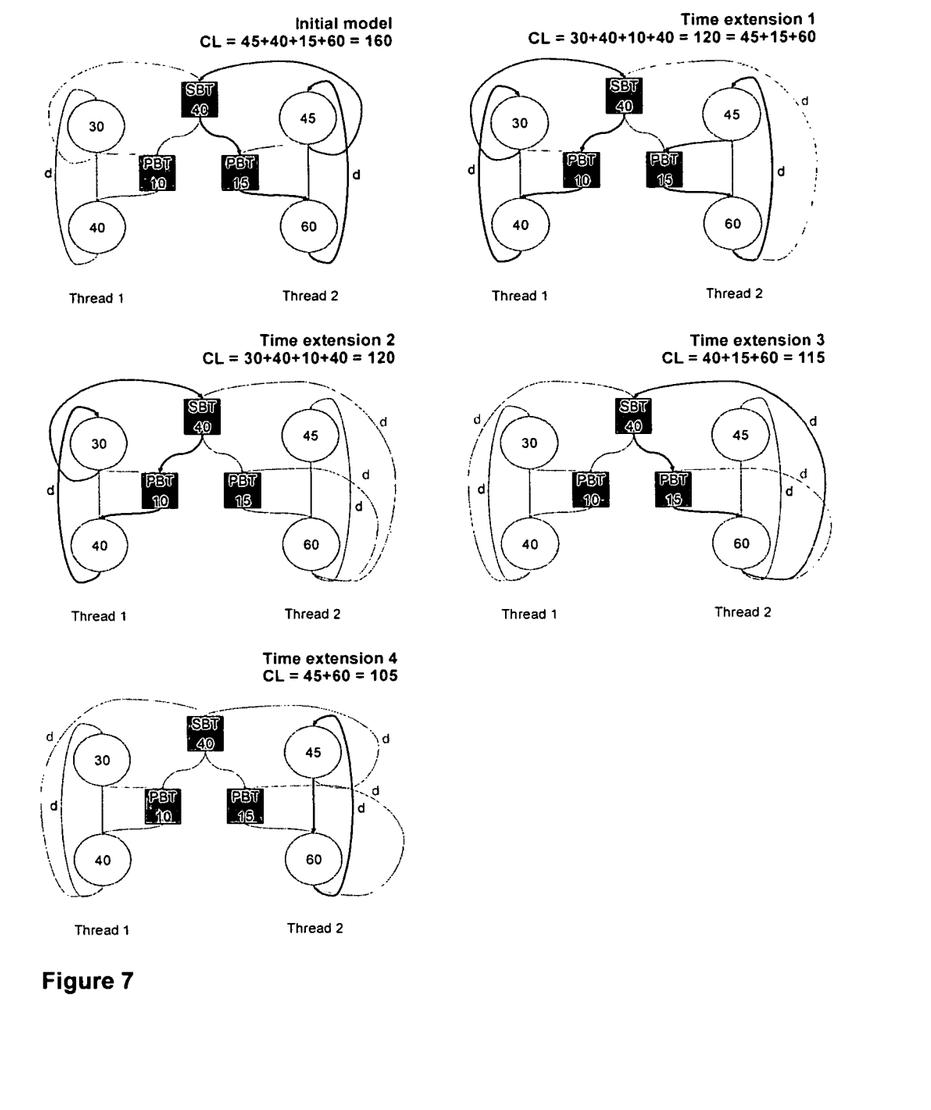
FIG. 7 illustrates time extensions and time estimations on a parallel thread model is an iterative process.

Time extensions and the corresponding time estimation can be performed directly on the parallel thread model. This is done using an iterative process, which is illustrated in FIG. 7 for two threads synchronized via a shared block transfer SBT and two dependent private block transfers PBT. The parallel model is initialized with block transfers, which are scheduled just in time. The critical path is indicated in bold and consists of thread 2, the shared block transfer and the private block transfer. Time extensions are only useful for block transfers in the critical path. Time extension 1 moves the issuing edge of the shared block transfer in thread 2 to the end of the previous iteration (=pipelining). This results in a smaller critical path duration. The block transfers are further incrementally time extended until the optimal critical path duration is found in Time extension 4. The critical path now consists of the computation nodes of thread 2 and the block transfers are parallel pipelined with the previous iteration.

Multi-Processor Bandwidth Balancing

Bus conflicts due to parallel block transfers in a multiprocessor environment have a significant influence on the total execution time. Threads are running asynchronously, leading to unpredictable interference of block transfers. Timing estimation of the global system, which is needed for a cost-efficient flexible design, therefore becomes very difficult.

As discussed in the previous sections, latencies of block transfers can be hidden by issuing block transfers earlier, such that useful computation can be performed during the block transfer handling.

Figure 8:
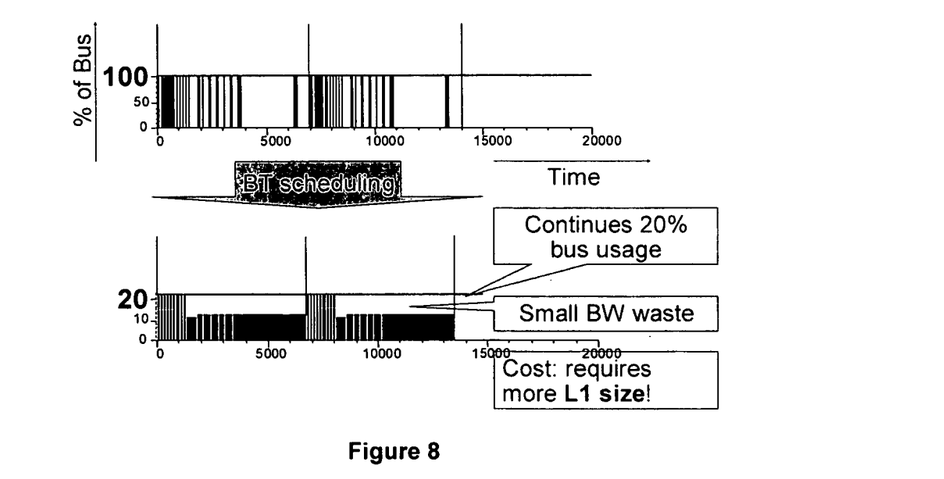
FIG. 8 is an illustration that unpredictable bursty block transferst (BTs) can be made more predictable.

This block transfer scheduling can also be used for balancing the required bandwidth over a longer time period, as such avoiding the peak bandwidth usage of 100% when loading the data just in time. This is illustrated in FIG. 8 where only a peak bus usage of 20% is required. All concurrently running applications can be assigned a logical (e.g. time-multiplexed) communication channel with a smaller bandwidth, where the sum does not exceed the total bandwidth available. The predictability and gain in execution time is associated with the cost of more memory space to store the data which is transferred earlier than needed, and possibly some wasted bandwidth in the logical channels.

While the above detailed description has shown, described, and pointed out novel features of the invention as applied to various embodiments, it will be understood that various omissions, substitutions, and changes in the form and details of the device or process illustrated may be made by those skilled in the technology without departing from the spirit of the invention. The scope of the invention is indicated by the appended claims rather than by the foregoing description. All changes which come within the meaning and range of equivalency of the claims are to be embraced within their scope.

What is claimed is:

1. A method of determining an optimal mapping of application code, enabling efficient execution of the code on a digital system comprising a plurality of computation units and a plurality of memories arranged in a hierarchy connected by a network, the method comprising:

loading a representation of application code, describing the functionality of the application, wherein the code comprises data access instructions on array signals, the representation of the code being partitioned in a plurality of code threads and the representation comprising information on data access dependencies between the code threads;

determining for at least one array signal and for at least one data access instruction on the array signal a graph having a plurality of data groupings, the data groupings comprising portions of the array signals that are copied from one layer of memory to a lower layer of memory within the hierarchy of memories, the one layer of memory consumes more power than the lower layer of memory, and the graph indicating for each data grouping of the plurality of data groupings, whether the data grouping is assignable to more than one of the code threads;

evaluating combinations of the data groupings using an evaluation criterion; and selecting the combination of the data groupings with an optimum evaluation criterion within a pre-determined tolerance, and wherein the selection defines the optimal mapping of data groupings within the hierarchy of memories, the selection is based on a tradeoff between size of a data grouping and energy costs for copying the data grouping from one layer of memory to a lower layer of memory, while taking into account inter-thread data access dependencies and cost of inter-thread synchronization when a data grouping is assignable to more than one of the code threads, the selection resulting in a memory reuse that reduces power consumption of the digital system.

2. The method of claim 1, wherein the evaluation criterion comprises energy consumption for executing data accesses to the memories.

3. The method of claim 1, wherein the evaluation criterion comprises energy consumption of data transfers needed for inter-thread synchronization.

4. The method of claim 1, wherein the hierarchy of memories comprise a set of first memories, each of the first memories assigned to a computation unit, and at least one second memory, assigned to at least two of the computation units, the data accesses comprising data transfers between the first memories and the computation units and data transfers between the first memories and the second memory, wherein the set of first memories and the second memory are at different memory layers within the memory hierarchy, wherein each of the set of first memories is smaller than the second memory, and wherein the second memory is functionally more distant from the processor than the set of first memories and consumes more power than each of the first set of memories.

5. The method of claim 1, wherein the selecting comprises performing life-time analysis of the arrays taking into account accesses on the array by at least two of the threads.

6. The method of claim 1, wherein the selecting comprises performing an array-level dependency analysis.

7. The method of claim 1, wherein the representation comprises a geometric model.

8. The method of claim 1, wherein the determining comprises determining at least two data grouping access timing possibilities to the data groupings within the hierarchy of memories, wherein the evaluating comprises evaluating the data access timing possibilities and the selecting comprises selecting one of the data grouping access timing possibilities.

9. The method of claim 8, wherein the data access timing possibilities comprise at least one timing before the data access is required by a code thread.

10. A method of modifying application code enabling efficient execution of the code on an essentially digital system comprising a plurality of computation units and a plurality of memories arranged in a hierarchy, connected by a network, the method comprising:
applying the method of claim 1; and
modifying the application code based on the selected combination of the data groupings within the hierarchy of memories such that the modified application code comprises data accesses to the selected data groupings within the hierarchy of memories while preventing occurrence of violations of the data access dependencies between the code threads in case the data groupings within the hierarchy of memories are assignable to more than one code thread.

11. The method of claim 10, wherein the preventing of occurrence of data access dependency violations is performed by providing synchronization instructions within the modified code.

12. The method of claim 10, wherein the modifying of the code comprises imposing the data accesses to the data groupings within the hierarchy of memories at a selected data access timing.

13. A non-transitory computer-readable medium having stored therein a computer program which, when executed on a processor, performs the method of claim 10.

14. A non-transitory computer-readable medium having stored therein a computer program which, when executed on a processor, performs the method of claim 1.

15. An automated code mapping system for determining an optimal mapping of application code, enabling efficient execution of the code on a digital system comprising a plurality of computation units and a plurality of memories arranged in a hierarchy connected by a network, the automated code mapping system comprising:
a memory module configured to store a representation of application code, describing the functionality of the application, wherein the code comprises data access instructions on array signals, the representation of the code being partitioned in a plurality of code threads and the representation comprising information on data access dependencies between the code threads;
a first computing device configured to determine for at least one array signal and for at least one data access instruction on the array signal a graph having a plurality of data groupings, the data groupings comprising portions of the array signals that are copied from one layer of memory to a lower layer of memory within the hierarchy of memories, the one layer of memory consumes more power than the lower layer of memory, and the graph indicating, for each data grouping of the plurality of data groupings, whether the data grouping is assignable to more than one of the code threads;
a second computing device configured to evaluate combinations of the data groupings within the hierarchy of memories using an evaluation criterion; and
a third computing device configured to select the combination of the data groupings within the hierarchy of memories with an optimum evaluation criterion within a pre-determined tolerance, wherein the selection defines the optimal mapping of data groupings within the hierarchy of memories, the selection is based on a tradeoff between size of a data grouping and energy costs for copying the data grouping from one layer of memory to a lower layer of memory, while taking into account inter-thread data access dependencies and cost of inter-thread synchronization when a data grouping is assignable to more than one of the code threads, the selection resulting in memory reuse that reduces power consumption of the digital system.

16. The automated code mapping system of claim 15, wherein the hierarchy of memories comprise a set of first memories, each of the first memories assigned to a computation unit, and at least one second memory, assigned to at least two of the computation units, the data accesses comprising data transfers between the first memories and the computation units and data transfers between the first memories and the second memory, wherein the set of first memories and the second memory are at different memory layers within the memory hierarchy, wherein each of the set of first memories is smaller than the second memory, and wherein the second memory is functionally more distant from the processor than the set of first memories and consumes more power than each of the first set of memories.

17. An automated code modification system for modifying application code enabling efficient execution of the code on an essentially digital system comprising a plurality of computation units and a plurality of memories arranged in a hierarchy, connected by a network, the automated code modification system comprising:

a memory module configured to store a representation of application code, describing the functionality of the application, wherein the code comprises data access instructions on array signals, the representation of the code being partitioned in a plurality of code threads and the representation comprising information on data access dependencies between the code threads;

a first computation device configured to determine for at least one array signal and for at least one data access instruction on the array signal a graph having a plurality of data groupings, the data groupings comprising portions of the array signals that are copied from one layer of memory to a lower layer of memory within the hierarchy of memories, the one layer of memory consumes more power than the lower layer of memory, and the graph indicating, for each data grouping of the plurality of data groupings, whether the data grouping is assignable to more than one of the code threads;

a second computation device configured to evaluate combinations of the data groupings using an evaluation criterion;

a third computation device configured to select the combination of the data groupings within the hierarchy of memories with an optimum evaluation criterion within a pre-determined tolerance, wherein the selection defines an optimal mapping of data groupings within the hierarchy of memories, the selection is based on a tradeoff between size of a data grouping and energy costs for copying the data grouping from one layer of memory to a lower layer of memory, while taking into account inter-thread data access dependencies and cost of inter-thread synchronization when a data grouping is assignable to more than one of the code threads, the selection resulting in memory reuse that reduces power consumption of the digital system, and a programming device configured to modify the application code based on the selected combination of the data groupings within the hierarchy of memories such that the modified application code comprises data accesses to the selected data groupings while preventing occurrence of violations of the data access dependencies between the code threads in case the data groupings within the hierarchy of memories are assignable to more than one code thread.

\* \* \* \* \*

UNITED STATES PATENT AND TRADEMARK OFFICE
CERTIFICATE OF CORRECTION

PATENT NO. : 8,473,934 B2  
APPLICATION NO. : 11/486986  
DATED : June 25, 2013  
INVENTOR(S) : Brockmeyer et al.

Page 1 of 1

It is certified that error appears in the above-identified patent and that said Letters Patent is hereby corrected as shown below:

In column 12 at line 32 (approx.), Below "...=C[];" insert

--SBT_issue(id);    /* issue block transfer: A[ ] -> A_copy[ ] */--.

Signed and Sealed this  
Twenty-fourth Day of December, 2013

Margaret A. Focarino  
*Commissioner for Patents of the United States Patent and Trademark Office*